United States Patent [19]
Roe et al.

[11] Patent Number: 5,555,161
[45] Date of Patent: Sep. 10, 1996

[54] BI-FUNCTIONAL LIGHT PIPE AND DISPLAY ASSEMBLY

[75] Inventors: Pamela A. Roe; Dale J. Igram, both of Kokomo, Ind.

[73] Assignee: Delco Electronics Corporation, Kokomo, Ind.

[21] Appl. No.: 526,342

[22] Filed: Sep. 11, 1995

[51] Int. Cl.[6] ........................................... F21V 7/04
[52] U.S. Cl. ............................ 362/32; 362/800; 116/28.1; 116/DIG. 20; 116/202; 116/DIG. 5
[58] Field of Search .................... 362/32, 800; 116/28.1, 116/202, DIG. 5, DIG. 20, DIG. 26

[56] References Cited

U.S. PATENT DOCUMENTS

| | | | |
|---|---|---|---|
| 4,782,782 | 11/1988 | Nill | 116/DIG. 20 |
| 4,798,160 | 1/1989 | Mochida et al. | 116/DIG. 20 |
| 5,245,313 | 9/1993 | Polityka | 116/28.1 |
| 5,349,504 | 9/1994 | Simms et al. | 362/32 |

*Primary Examiner*—Denise L. Gromada
*Assistant Examiner*—Alfred Basichas
*Attorney, Agent, or Firm*—Jimmy L. Funke

[57] ABSTRACT

An illuminated annunciator as in a gear selector has gear designation letters always lit and a ring around each letter selectively lit to indicate the active gear range. A generally conical light pipe with a conical central cavity has at one end an annular emitting surface adjacent the ring and at the other end it is illuminated by an LED. Another LED within the conical cavity illuminates the letter directly as well as via reflection from the wall of the cavity.

14 Claims, 1 Drawing Sheet

BI-FUNCTIONAL LIGHT PIPE AND DISPLAY ASSEMBLY

FIELD OF THE INVENTION

This invention relates to an illuminated display and particularly to such a display having selective illumination of adjacent indicia on a panel or other device.

BACKGROUND OF THE INVENTION

In automotive displays such as air control buttons, gear selector indicators and the like, an indication or telltale is often energized by selective lighting. That is, a symbol, legend or other indicia is illuminated only when its function is active. Alternatively, several indicia are normally illuminated and a special marker or highlight function is illuminated to show which of the indicia functions is active. This latter arrangement is useful in the case of buttons so that the identity and location of each button is readily visible and any activated button is separately highlighted. Such a highlight is, for example, a selectively lighted ring around the identifying indicia.

The center, identifying legend is readily illuminated by a small lamp such as a light emitting diode (LED) near the legend, although special precautions may be necessary to assure uniform illumination. However it is a greater challenge to separately illuminate a marker such as a ring around the legend, particularly in view of the light source for the legend. Such devices must be very compact especially when used within a pushbutton.

SUMMARY OF THE INVENTION

It is therefore an object of the invention to effectively illuminate separate adjacent indicia related to the same function. It is a further object to uniformly illuminate a central indicia and a peripheral indicia with a compact lighting assembly suitable for pushbuttons.

A panel or button typically has a translucent body partially by an opaque paint with openings defining the desired indicia. In particular, the indicia may comprise a legend encircled by a ring. A generally conical light pipe within the button or behind the panel has a conical hollow interior. The large end of the light pipe is annular and has the same size as the ring indicia. Two LEDs, preferably of different colors, are associated with the light pipe: one is mounted within the hollow interior to light the legend, and the other is at the small end of the light pipe to illuminate the light pipe. The light pipe is aligned with its annular end against the ring for ring illumination, and surrounds the legend so that the LED within the hollow interior lights the legend.

To assure that the interior LED does not create a hot spot at the center of the legend, the light pipe is arranged to reflect marginal light onto the edges of the central legend. The LED emits light in a conical pattern. The interior wall of the light pipe has a sufficiently small angle B, as shown in FIG. 4, so that the marginal portion of the LED pattern intercepts the wall and is reflected toward the display, particularly toward the margin of the central legend, while the inner portion of the pattern directly lights the central legend. Since the reflected light reinforces the weak marginal direct light, uniformity of the legend illumination is enhanced.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

The ensuing description is directed to an application of the invention to a gear selector annunciator wherein several gear indicia are always lighted during vehicle operation and only one gear range is highlighted to indicate which gear is currently selected. It will be understood that the invention is applicable to any illuminated display using at least two separate lights to illuminate different portions of the display. In this way the two portions may be illuminated either at the same time or separately and light sources of different light patterns, colors or intensities may be employed. The invention is especially useful where one of the light sources illuminates a ring or other pattern which surrounds a central indicia lighted by another source.

Figure 1:
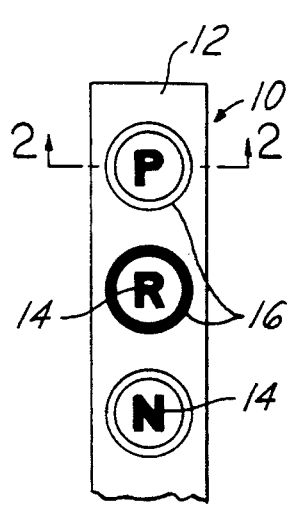
FIG. 1 is a front view of a gear select annunciator incorporating illumination features according to the invention.

FIG. 1 shows a portion of a transmission gear selector annunciator 10 which can be a part of an automotive instrument cluster or can be located elsewhere in the sight of the operator. The annunciator 10 includes a panel 12 bearing indicia comprising a series of letters 14 (P, R, N, etc.) indicating gear ranges and a ring 16 surrounding each letter. Blackened regions are used in the drawing to represent illuminated indicia in the display. As shown, all the letters are illuminated and only the ring 16 around the letter R is illuminated. This highlighting reveals that the reverse transmission range is selected. Thus the illumination of rings 16 changes according to different gear selections.

Figure 2:
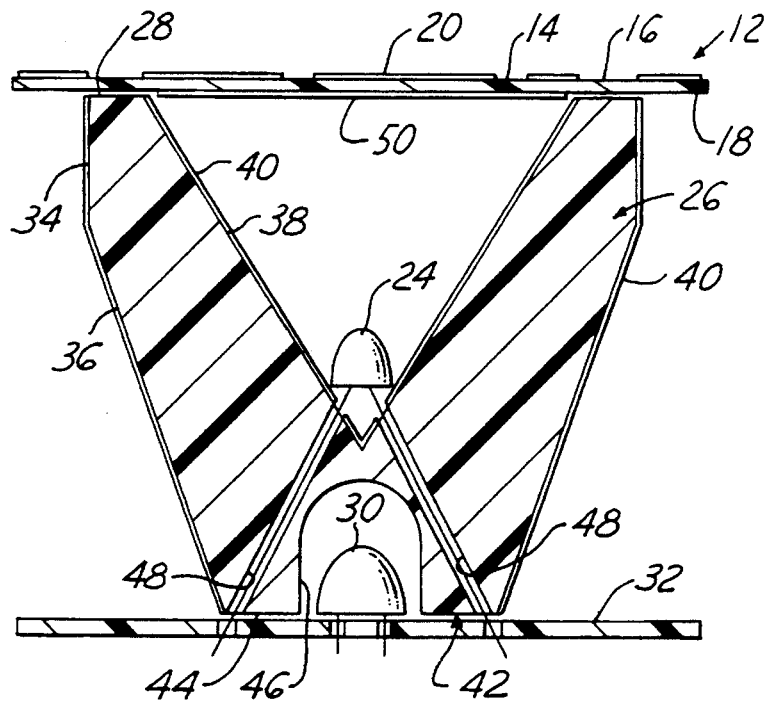
FIG. 2 is a cross section of a display assembly taken along line 2—2 of FIG. 1.

As shown in FIG. 2, the panel 12 comprises a translucent or transparent substrate 18 bearing a patterned opaque coating 20 which has openings defining a letter 14 and the ring 16. Such patterns are commonly formed by silk screening or by coating the panel and removing selected area of the coating by laser beam. The panel is lighted by two separate light sources for each letter and its associated ring. For each letter a first LED 24 is positioned behind the panel to illuminate the area within the ring. A generally conical hollow light pipe 26 having an annular forward edge 28 aligned with the ring 16 carries light from a second LED 30 at the rear of the light pipe 26. A circuit board 32 behind the light pipe supports both of the LEDs by their leads.

Figure 3:
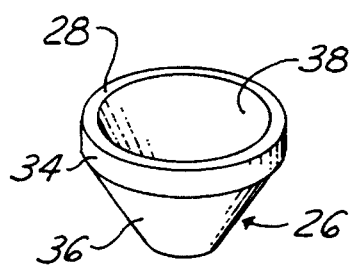
FIG. 3 is an isometric view of a light pipe used in the assembly of FIG. 2.

The light pipe 26, also shown in FIG. 3, is a molded acrylic or polycarbonate element having an outer shape comprising a forward cylindrical surface 34 and a rear frustoconical surface 36, and an inner shape comprising a conical surface 38. Each of these three surfaces 34–38 are coated with a white paint to establish diffuse reflective films 40. The rear surface 42 of the light pipe comprises a flat annulus 44 surrounding a central cavity 46 which receives the LED 30. The cavity affords coupling of light from the LED 30 into the light pipe 26. Holes 48 through the light pipe from the inner surface 38 to the rear surface 42 allow the leads of LED 24 to reach the circuit board 32. Thus the LED 24 is located near the apex of the inner surface 38.

Figure 4:
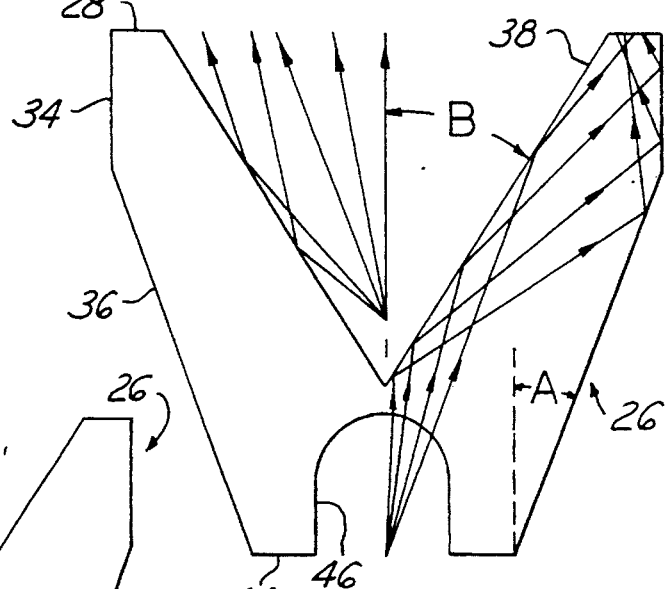
FIG. 4 is an outline of a light pipe cross section with ray diagram superimposed to illustrate the principle of the invention.
Figure 5:
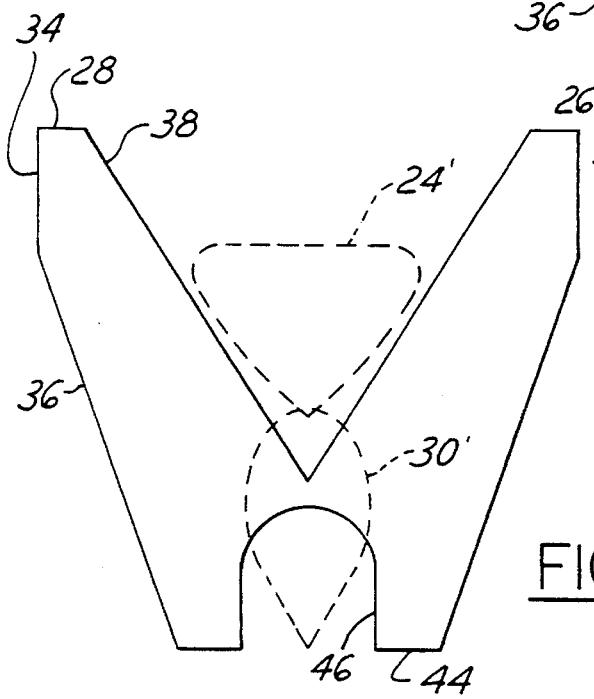
FIG. 5 is an outline of a light pipe cross section with a superimposed LED light pattern.

As shown in the light ray diagram of FIG. 4, the light entering the light pipe via the cavity 46 is internally reflected at the inner surface 38 and thus directed toward the forward annulus 28 or again reflected from the outer wall 34 and/or 36 to the annulus 28. The cone angle A of the outer surface 36 relative to the cone axis and the cone angle B of the inner surface 38 relative to the axis are selected to assure that the incoming light ultimately reaches the forward annulus 28 and moreover, that the annulus is lighted with uniform intensity. Space constraints play an important part in determining the shape of the light pipe. Each type of LED has a distinctive light pattern, and a LED is chosen with a light pattern which complements the light pipe geometry. As shown in FIG. 5, the light pattern 30' of LED 30 is a rather narrow conical pattern so that much of the light is directed generally forwardly. This is consistent with the grouping of the light rays in FIG. 4. With this type of light pattern and cone angles of A=20° and B=32°, bright, uniform illumination of the ring 16 was obtained. The light pipe was approximately one half inch in diameter and one half inch deep.

The LED 24 for lighting the region inside the ring preferably has a wide flat light pattern 24' as shown in FIG. 5 for even illumination of the region. The pattern intensity of LED 24 does fall off at the outer edge, however. In order to enhance the light intensity at the periphery, the cone angle B is made small enough to cause the inner surface to intercept the marginal rays of the light pattern, as shown in FIG. 4. These marginal rays are then reflected forwardly to the margin of the region to reinforce the light which directly impinges in that area. The ray diagram shows the specular reflection from the inner surface but because of the white coating 40 the reflected light will be diffused. Thus in addition to the considerations mentioned above, the angle B selected for the light pipe is partially determined by the requirements of lighting the inner region. If desired, a diffusing disc 50 behind the panel 12 and within the inner cone of the light pipe may be used to further enhance uniformity of illumination.

The films 40 of white paint further improve the uniformity of illumination. With respect to the lighting inside the ring, the matte finish of the film diffuses light from the LED 24 to more evenly reflect it onto the inner region. With respect to the light within the light guide, the paint film improves the internal reflection since some of the LED 30 light is emitted at the wrong angle for total reflection. The improvement not only increases brightness but also uniformity. While it is possible to discern shadows of the lead holes 48 in the displayed ring when the paint film is omitted, the shadows do not appear when the paint film is used.

Since the two LEDs illuminate separate indicia, they are easily controlled independently to obtain lighting as desired. For the gear selector annunciator it is preferred to always light the letters 14 and to light a ring 16 for only the active gear range. Moreover, the two LEDs can be of different colors or different intensities. For the exemplary illustration, a red LED 30 was chosen to effect a red ring 16 and a yellow-amber LED 24 was chosen to effect a different-colored letter 14.

The embodiments of the invention in which an exclusive property or privilege is claimed are defined as follows:

1. A light apparatus for separately lighting at least two adjacent indicia comprising:
   a light pipe having a reflective wall and an emitting surface aligned with a first indicia;
   a first light source adjacent the reflective wall of the light pipe for directing light onto other indicia which are not aligned with the emitting surface;
   a second light source coupled to the light pipe for illuminating the first indicia via the light pipe; and
   wherein the emitting surface surrounds a second indicia, and the light pipe comprises:
   a light input end smaller than the emitting surface;
   an outer wall expanding outward from the input end to the emitting surface; and
   the reflective wall tapers inward from the emitting surface to define an inner conical cavity;
   the first light source being in the cavity to illuminate the second indicia;
   whereby the second light source illuminates the first indicia by internal reflection from the outer wall and the reflective wall.

2. The invention as defined in claim 1 wherein the first light source comprises an LED emitting a pattern of light wherein a portion of the pattern directly illuminates a second indicia adjacent the first indicia, and another portion of the pattern impinges on the reflective wall and is reflected onto the second indicia.

3. In an illuminated display having two light sources for lighting the display, a light pipe assembly for directing the light from each source to a given portion of the display comprising:
   a light conductive body having a small light receiving end, a large light emitting end and a tapered outer wall connecting the ends;
   a tapered inner wall defining a hollow within the body, opening to the emitting end, whereby the walls define a peripheral zone at the emitting end;
   a first light source within the hollow for illumination of a central region bounded by the peripheral zone; and
   a second light source at the small end of the body for illumination of the peripheral zone.

4. The invention as defined in claim 3 wherein the inner and outer walls define a light pipe for internal reflection of light from the second light source; and
   the inner wall comprises a surface for external reflection of light from the first light source.

5. The invention as defined in claim 3 wherein each light source is an LED.

6. The invention as defined in claim 3 wherein at least one of the walls is coated with a reflective film to enhance uniformity of illumination.

7. The invention as defined in claim 3 wherein:
   the first light source is an LED having a conical light emission pattern, whereby a center portion of the pattern directly impinges on the central region and a marginal portion of the pattern impinges on the inner wall; and
   the inner wall tapers at an angle which effects reflection of light from the first source to the central region.

8. The invention as defined in claim 3 wherein:
   the second light source is an LED;
   the end of the light pipe includes a surface configuration for coupling light from the LED into the light pipe; and the walls of the light pipe are tapered at angles which internally reflect the light from the LED to the peripheral zone.

9. The invention as defined in claim 3 wherein the inner and outer walls are generally conical.

10. An illuminated display comprising:

display graphics having translucent central and peripheral indicia;

a light pipe for illuminating the peripheral indicia, the light pipe including a generally conical outer surface and a cavity having a conical inner surface;

the light pipe having an annular light emitting end adjacent the peripheral indicia and encircling the central indicia;

a first light source in the cavity for illumination of the central indicia; and a second light source for coupling light into the light pipe for illumination of the peripheral indicia.

11. The invention as defined in claim 10 wherein:

the first light source is an LED having a conical light emission pattern, whereby a central portion of the pattern directly impinges on the central indicia and a marginal portion of the pattern impinges on the inner surface; and the inner surface tapers at an angle which effects reflection of light from the first source to the central indicia.

12. The invention as defined in claim 11 wherein the inner wall is coated with a diffusely reflecting film thereby enhancing the uniformity of reflected light to the central indicia.

13. The invention as defined in claim 10 wherein:

the second light source is an LED;

the end of the light pipe includes a recess for receiving the LED and for coupling light from the LED into the light pipe; and the surfaces of the light pipe are tapered at angles which internally reflect the light from the LED to the peripheral indicia.

14. The invention as defined in claim 13 wherein the surfaces of the light pipe are coated with a reflective film to improve the uniform distribution of light to the peripheral indicia.

* * * * *